United States Patent Office 3,004,858
Patented Oct. 17, 1961

3,004,858
TITANIUM DIOXIDE PIGMENT OF IMPROVED DISPERSIBILITY
Gerard M. Sheehan and Walter R. Whately, Lynchburg, Va., and George Leathwhite Roberts, Jr., Somerville, N.J., assignors to American Cyanamid Company, New York, N.Y., a corporation of Maine
No Drawing. Filed Mar. 24, 1958, Ser. No. 723,132
15 Claims. (Cl. 106—300)

The present invention relates to dry titanium dioxide pigment of improved dispersibility in surface coating composition vehicles after compaction and storage. The invention particularly relates to such pigment having the improved properties mentioned as the result of the presence thereon of a small amount of a non-ionic essentially linear alkylene oxide polymer.

Titanium dioxide is at present the premier white pigment of commerce. Practically all of this pigment is produced in centrally located plants and is delivered to customers in dry powder form. Generally the pigment is packaged in 50-lb. multi-wall paper bags which are shipped by truck or rail. The bags are warehoused before and after shipment for periods of time required by circumstances. Generally at least several weeks elapse between manufacture of the pigment and its utilization by the customer, so that prior to use the pigment is subjected to protracted warehousing. During warehousing and shipment the bags are stacked upon each other, so that the pigment is stored under substantial pressure.

The size of titanium dioxide pigment particles is maintained within a narrow range to ensure best optical and physical properties, and it has long been known that the particles contain strong forces which cause them to clump together when packaged and stored. Dispersion of such pigment to optimum extent in surface coating vehicles consequently requires expenditure of a substantial amount of energy, and in the past the addition of a suitable dispersing agent to the vehicle has been considered a practical necessity for the purpose. The vehicles referred to include linseed oil and other drying and non-drying oils, alkyd resins, alkylated amine-aldehyde resins, and water in the case of latex paints.

The discovery has now been made that dry titanium dioxide pigment carrying in molecularly adsorbed form a small amount of a non-ionic alkylene oxide polymer containing at least five consecutive —C—C—O— groups is substantially improved as regards its dispersibility in surface coating composition vehicles after it has been stored for protracted periods of time under pressure. The pigment is prepared by a process which broadly comprises uniformly contacting the particles with a small amount of the polymer. A substantial proportion of the polymer is substantively adsorbed by the particles.

Pigment prepared according to preferred embodiments of the present invention possesses the following advantages:

(1) The pigment is substantially improved as regards vehicle dispersibility. A decrease of more than 80% in the number of oversize aggregates has been frequently achieved, and the results in organic vehicles and water have been closely similar. The invention thus permits a substantial saving in power required for dispersion.

(2) The pigment exhibits greater tendency to dry flow. It is thus considerably easier to empty from the bags in which it is shipped.

(3) The pigment is substantially unaffected as regards its other principal physical properties. Oil adsorption, color, gloss, opacity, specific electrical resistance and chalk resistance values remain substantially unchanged.

(4) The treating agent is highly resistant to removal when the pigment is contacted with water or organic solvents. The dispersibility characteristics of the pigment are thus permanent.

(5) The treating agent may be applied as an incident to the finishing procedure to which titanium dioxide pigment is normally subjected. The invention thus does not require a separate finishing step.

The amount of treating agent carried by the pigment of the present invention is surprisingly small. The minimum effective amount has not yet been determined, but based upon the assumption that 100% of the treating agent applied in dilute solution form is retained by the pigment; the evidence is that this minimum is about 0.01% of the dry weight of the pigment. At the other extreme, pigment carrying more than about 3% by weight of polymer (estimated in the same manner) possesses closely similar properties to the properties possessed by pigment carrying somewhat less polymer, so that the value of 3% is taken as the upper practical limit. In practice we find that the maximum improvement per increment of agent occurs in the range of about 0.1% to 1%, and this range is accordingly preferred.

The titanium dioxide pigment benefitted by the present invention includes the grades which contain small amounts of alkali metal and alkali earth metal salts as conditioning agents; the salts of other metals such as antimony, chromium and zinc as brighteners and rutile converters; and the hydrous oxides of alumina, titanium, zirconium, silica and similar elements as agents improving the color and chalk resistant values of the pigment. The amount of these added salts and agents is normally very minor and less than 5% of the weight of the pigment. The invention is further usefully applied to titanium dioxide pigment containing extender material such as calcium sulfate, barium sulfate, lithopone, etc.

More in detail, pigment according to the present invention can be prepared according to a number of procedures. One convenient method is to meter the treating agent and the pigment into a fluid energy mill such as that disclosed in U.S. Patent No. 2,219,011 granted on October 22, 1940, to Kidwell et al. (wherein pigment particles are made to collide or rub together while traveling spirally at supersonic speeds in a jet or current of superheated steam). With care, it is possible to meter the small amount of treating agent uniformly into the stream of pigment as it enters the mill; the high temperature and violent collisions spread the agent over the surface of the particles. Both water-soluble and water-insoluble polymers may be applied by this method.

In practice, we have found it more convenient to supply the alkylene oxide polymer by the use of a solvent medium. According to this method the polymer is dissolved in a suitable solvent and the solution added to a slurry of titanium dioxide pigment. The slurry is then agitated until the treating agent is uniformly distributed, after which it may be dried, upon which the polymer is adsorbed on the surface of the particles. The solvent may be an organic liquid or water, depending on the solubility characteristics of the polymer. However, the commercial available alkylene oxide polymers are soluble in water and this material is accordingly preferred as the solvent medium. The pigment may be in flocculated or de-flocculated form during treatment. Commercially, we find it most convenient to add the polymer to the slurry resulting from the hydroclassification step to which pigment is subjected to remove oversize (+4 micron) particles.

The treating solution may contain alkylene oxide polymer in excess of the proportion specified. The proportions specified assume that none of the treating agent will be lost, and allowance should be made for treating agent lost by filtering off the solvent medium or subsequent washing of the pigment.

A number of alkylene oxide polymers which are useful as treating agents are water-insoluble. These may be applied from aqueous medium after emulsification. One suitable method is to form the polymer (as such or dissolved in a water-insoluble liquid) into an aqueous colloidal emulsion and add an effective amount of the emulsion to a slurry of the pigment. The slurry is then filtered to form a wet cake having the polymer uniformly distributed therethrough; molecular adsorption of the polymer on the pigment occurs when the cake is dried. The bond between the treating agent and the pigment is so strong that the pigment may be dried if desired in a fluid energy mill operated with superheated steam.

It is within the scope of the invention to apply the treating agent in emulsion form by spraying dewatered pigment slurry therewith. The treating agent may be applied in this manner while an aqueous suspension of titanium dioxide pigment is being dewatered on a continuous rotary vacuum drum filter, the emulsion being sprayed on the layer of cake on the drum while it is on the vacuum side.

The polymers adsorbed on pigment according to the present invention contain at least five alkylene oxide —C—C—O— groups, this being the fewest groups needed for effective adsorption. Better results are obtained with alkylene oxide polymers of higher molecular weight, and so far as we are aware, there is no upper limit to the size of the polymers which can be usefully employed. We have successfully used alkylene oxide polymers containing 500 —C—C—O— groups. The benefits resulting from increased polymer size become evident when the polymer contains roughly 15 consecutive —C—C—O— groupings, equivalent to a molecular weight of roughly 700. On the other hand, the benefits associated with large molecular size tend to level off when the polymer contains more than roughly 150 —C—C—O— units (equivalent to a molecular weight of roughtly 7,000). Polymers having consecutive alkylene oxide groups within this range are preferred as the higher molecular weight polymers are more costly.

Polymers useful in the present invention include these formed by homopolymerizing ethylene oxide, butylene oxide, propylene oxide, etc., and polymerized mixtures thereof. Of these ethylene oxide is preferred as it imparts very satisfactory dispersibility to titanium dioxide pigment both in water and in organic surface coating vehicles. Additional polymers may be formed by reacting a high molecular weight alkylene oxide polymer with one or two mols of a fatty acid or fatty acid chloride; by reacting an alkylene oxide with a non-ionic aryl hydroxy compound, for example, an alkyl phenol or naphthol followed by reacting the condensation product with one mol of a higher fatty acid or acid chloride.

The invention will be further described by the examples which follow. These examples represent specific embodiments of the invention and are not to be construed as limitations thereon.

*Example 1*

The following illustrates the improved dispersibility of titanium dioxide pigment having an alkylene oxide polymer adsorbed thereon according to the present invention in a paint vehicle after compaction and storage.

The pigment samples were prepared by slurrying titanium dioxide pigment (shown in the table below) with an aqueous polyethylene oxide solution. In each instance, 400 gm. of the pigment was slurried in 560 cc. of water and 4 gm. of polyethylene glycol having an average molecular weight of 4,000 was slowly added as a 10% aqueous solution with vigorous agitation. The slurries were stirred for 15 minutes, after which they were dewatered by filtration, 170 cc. of water being thus removed. The pigment samples were dried at 110° C. and passed through a fluid energy mill such as that shown in U.S. Patent No. 2,284,746 operated on superheated steam at 450° F. and 120 lb./in.$^2$ pressure (pigment residence time about one second).

The dispersibility of each of the pigment samples thus obtained was determined initially in a typical paint vehicle by standard laboratory method whereby 60 gm. of pigment is added to 21 gm. of an air-drying phthalic anhydride-pentaerythritol-soybean oil alkyl resin dissolved in 10 gm. of mineral spirits. The composition is slowly blended until the pigment is apparently uniformly distributed, after which 10 gm. of the paste is stirred with 15 gm. of mineral spirits until all visible lumps are dispersed. The slurry is poured through a 325-mesh screen and the screen washed with mineral spirits until the washings run clear. The screen is dried at 110° C. and the residue is brushed off and weighed. This residue is taken as the pigment fraction which is undispersed and is recorded as a percent based on the dry weight of the pigment in the slurry.

Additional samples of dry pigment were stored two months under 20 lb./in.$^2$ pressure and retested. Results are as follows, shown in comparison with the results obtained with corresponding untreated pigment as controls.

| Run No. | Pigment | Percent polyethylene oxide [1] | Percent pigment undispersed | | Percent decrease |
|---|---|---|---|---|---|
| | | | Initial | After 2 months storage | |
| 1 | Anatase [2] | None | 0.1 | 8.2 | |
| 1-A | ----do.[2] | 1.0 | 0.1 | 1.3 | 84 |
| 2 | Rutile [2] | None | 0.1 | 8.0 | |
| 2-A | ----do.[2] | 1.0 | 0.1 | 1.1 | 86 |
| 3 | Non-chalk rutile [4] | None | 0.3 | 3.0 | |
| 3-A | ----do.[3] | 1.0 | 0.3 | 0.5 | 83 |

[1] Amount added to pigment slurry based on dry weight of pigment. Of this 28% was lost when the pigment slurry was filtered.
[2] Calciner discharge ground, hydroclassified and dried.
[3] Pigment of runs 3 and 3-A coated with 1% by weight of silica hydrate and 2% by weight of alumina hydrate calculated as $SiO_2$ and $Al_2O_3$ respectively.

The procedure of run 1-A was repeated except that pigment, after treatment with the polyethylene oxide solution, was divided into portions which were respectively washed with water, methanol, benzene, xylene, mineral spirits, and acetone. The pigment samples had dispersibility values in the range of 1%–3%, showing that the polyalkylene oxide was molecularly adsorbed.

*Example 2*

The following illustrates the effectiveness of different amounts of two alkylene oxide polymers in improving the dispersibility of titanium dioxide pigment on storage.

The procedure of Example 1 was followed using titanium dioxide corresponding to the pigment of runs 2 and 2-A of the example, except that the alkylene oxide polymers used were as shown in the table below, and determination of the initial dispersibility of the pigment was omitted. Results are as follows.

| Run No. | Alkylene oxide polymer | | Percent pigment undispersed [2] |
|---|---|---|---|
| | Formula | Percent added [1] | |
| 1 | None (control) | | 2.6 |
| 2 | $HO(CH_2CH_2O)_{125}H$ | 0.1 | 0.9 |
| 3 | ---do--- | 0.25 | 0.9 |
| 4 | ---do--- | 0.33 | 0.6 |
| 5 | ---do--- | 0.5 | 0.5 |
| 6 | ---do--- | 1.0 | 0.4 |
| 7 | ---do--- | 2.0 | 0.2 |
| 8 | Control | | 3.1 |
| 9 | $p\text{-}C_9H_{19}C_6H_4O(CH_2CH_2O)_{20}H$ | 0.1 | 1.2 |
| 10 | ---do--- | 0.25 | 1.0 |
| 11 | ---do--- | 0.5 | 0.9 |
| 12 | ---do--- | 1.0 | 0.7 |
| 13 | ---do--- | 2.0 | 0.4 |
| 14 | ---do--- | 3.0 | 0.3 |

[1] To slurry, based on dry weight of the pigment.
[2] After 2 months of storage under 20 lb./in.[2] pressure.

Extrapolation of the above results indicate that as little as 0.01% of the polymers gives useful results.

The results show that as little as 0.1% of the treating agent produces a substantial benefit and that the benefit continues at least up to the 2% treating level. The results further show that better results are obtained when the treating agent contains a high number of ethyleneoxy units.

*Example 3*

The following illustrates the variety of alkylene oxide polymers, both water-soluble and water-insoluble, which titanium dioxide pigment may advantageously carry according to the present invention. The same pigment was used as was employed for the work described under Example 2. The method of Example 1 was followed in the case of the water-soluble treating agents. The water-insoluble agents were added to the pigment slurries in the form of 15% by weight aqueous emulsions prepared by emulsifying the agents with hot water containing a small amout of Tamol 731 (disodium dinaphthyl disulfomethane) as emulsifier followed by homogenization and rapid cooling; otherwise the method of Example 1 was followed as to these agents as well. Results are as follows.

| Run No. | Pigment | Alkylene oxide polymer added | | | Percent pigment undisp. |
|---|---|---|---|---|---|
| | | Form | Formula | Percent | |
| 1 | Rutile [1] | | Control | None | 3.5 |
| 2 | ---do.[1] | Sol | $HO(CH_2CH_2O)_7H$ | 1.0 | 0.6 |
| 3 | ---do.[1] | Sol | $HO(CH_2CH_2O)_{25}H$ | 1.0 | 0.5 |
| 4 | ---do.[1] | Sol | $HO(CH_2CH_2O)_{125}H$ | 1.0 | 0.4 |
| 5 | ---do.[1] | Sol | $HO[CH(CH_3)CH_2O]_{50}H$ | 1.0 | 0.4 |
| 6 | ---do.[1] | Sol | $p\text{-}C_9H_{19}C_6H_4O(CH_2CH_2O)_5H$ | 1.0 | 0.4 |
| 7 | ---do.[1] | Sol | $p\text{-}C_9H_{19}C_6H_4O(CH_2CH_2O)_{10}CH=CH_2$ | 1.0 | 0.6 |
| 8 | ---do.[1] | Emul | $p\text{-}C_9H_{19}C_6H_4O(CH_2CH_2O)_5CH_2CH_2CN$ | 1.0 | 0.7 |
| 9 | ---do.[1] | Emul | $p\text{-}C_9H_{19}C_6H_4O(CH_2CH_2O)_5CH_2CH_2Cl$ | 1.0 | 0.7 |
| 10 | ---do.[1] | Sol | $p\text{-}C_9H_{19}C_6H_4O(CH_2CH_2O)_{10}H$ | 1.0 | 0.6 |
| 11 | ---do.[1] | Emul | $p\text{-}C_9H_{19}C_6H_4O(CH_2CH_2O)_{200}OCH_{33}C_{17}$ | 1.0 | 0.4 |
| 12 | ---do.[1] | Emul | $C_{12}H_{25}COO(CH_2CH_2O)_{125}OCH_{25}C_{12}$ | 1.0 | 0.4 |
| 13 | ---do.[1] | Sol | $HO(CH_2CH_2O)_{125}OCH_2CH_2OCH_3$ | 1.0 | 0.4 |
| 14 | ---do.[1] | Sol | $C_{17}H_{35}CONH(CH_2CH_2O)_{10}H$ | 1.0 | 0.4 |
| 15 | ---do.[1] | Sol | $C_{17}H_{35}CONH(CH_2CH_2O)_{10}H$ | 1.0 | 0.4 |
| 16 | Anatase | | Control | None | 8.2 |
| 17 | ---do.[1] | Sol | $HO(CH_2CH_2O)_5H$ | 1.0 | 1.7 |
| 18 | ---do.[1] | Sol | $HO(CH_2CH_2O)_{200}H$ | 1.0 | 1.2 |
| 19 | ---do.[1] | Emul | $p\text{-}C_9H_{19}C_6H_4O(CH_2CH_2O)_5H$ | 1.0 | 1.5 |
| 20 | ---do.[1] | Sol | $p\text{-}C_9H_{19}C_6H_4O(CH_2CH_2O)_{25}H$ | 1.0 | 1.2 |
| 21 | Rutile [2] | | Control | None | 4.1 |
| 22 | ---do.[2] | Sol | $HO[CH(CH_3)CH_2O]_5H$ | 1.0 | 1.2 |
| 23 | ---do.[2] | Sol | Tall oil+15 mols ethylene oxide | 1.0 | 0.9 |

[1] For chalk resistant grade; cf. Ex. 1.
[2] Coated with 1% by weight of alumina hydrate calculated as $Al_2O_3$ for color retention.

*Example 4*

The following illustrates titanium dioxide pigment according to the present invention having improved dispersibility in water.

140 lb. of ethylene oxide homopolymerized to a molecular weight of 6000 (Carbowax 6000) was dissolved in 175 gal. of water and slowly added with vigorous agitation to an aqueous slurry of 14,000 lb. of $TiO_2$ pigment carrying 1% hydrous alumina (calculated as $Al_2O_3$). The pH of the suspension was adjusted to 8.0 with ammonium hydroxide and moderate stirring continued for three hours. The slurry was then dewatered as a continuous rotary vacuum drum filter, dried to a terminal temperature of 120° C. in a conveyor dryer counter-current to a stream of hot air entering at 160° C., passed through a fluid energy mill as described in Example 1, and tested by standard laboratory method to determine its dispersibility in water and the viscosity of the resulting aqueous slurry.

Into 155 gm. of N grade sodium silicate diluted with 55 gm. of water (sp. gr. 1.26 at 80° F.) was slowly sifted with rapid agitation 60 gm. of the above pigment. Mixing was continued for four minutes, and the viscosity of the slurry determined. The dispersibility of the pigment was determined by pouring the slurry slowly through a wetted 20-mesh screen, after which 500 ml. of water was slowly poured through the screen to remove any undersize particles present. The dry weight of the oversize fraction on the screen was determined as a percentage of the titanium dioxide taken. Results are shown in comparison with control results obtained on titanium dioxide pigment prepared in the same manner except for addition of the high ethylene oxide homopolymer, and with the results obtained by use of a more organophilic lower ethylene oxide polymer.

| Run No. | Agent added | Viscosity of slurry [1] | Percent pigment on screen |
|---|---|---|---|
| 1 | None | 78 | 0.18 |
| 2 | Polyethylene oxide, 6,000 | 71 | 0.03 |
| 3 | $p\text{-}C_9H_{19}C_6H_4O(CH_2CH_2O)_5H$ | 75 | 0.09 |

[1] Krebs units; determined on Stormer viscosimeter.

The results show that the treatment is very effective in improving the dispersibility of the pigment in water.

*Example 5*

The strength with which the polymer treating agent is adsorbed on the pigment is illustrated by the following.

Titanium dioxide pigment carrying 1% by weight of hydrous aluminum oxide calculated as $Al_2O_3$ was treated with polymer by the method of Example 1, the polymer, except that the reaction product of 1 mol of nonylphenol with 15 mols of ethylene oxide was used as the treating agent, the pigment slurry was oven dried to avoid loss of polymer, and the step of jet milling was omitted for the same reason.

100 g. of the dry pigment thus prepared was placed in a laboratory Soxhlet apparatus and continuously extracted with acetone (a good solvent for the polymer) for 5 hours, after which the acetone was removed and the solids carried by the acetone recovered. The solids weighed 0.6 gm., showing that a very substantial proportion, i.e., at least 0.4 gm. (40%) of the polymer was strongly adsorbed on the pigment.

*Example 6*

The following illustrates the production of titanium dioxide pigment of good specific electrical resistance by the method of U.S. Patent No. 2,628,919, the dispersibility of the pigment being improved by a non-ionic treating agent according to the present invention. Calcined rutile titanium dioxide pigment (500 gm.) was micropulverized and slurried in alkaline demineralized water, and the slurry was hydroclassified, treated with 0.6% of $$BaCl_2 \cdot 2H_2O$$

adjusted to pH 7.0 and washed on a vacuum filter according to Example 1 of the patent. The pigment was then reslurried and 1.0% based on the dry weight thereof of polyethylene oxide (molecular weight 6,000) added as an aqueous solution, after which the slurry was stirred for 15 minutes and dewatered. The resulting cake was oven-dried and the pigment dry-milled.

The pigment had a specific electrical resistance of 42,000 ohms, showing it to be satisfactory for use in latex paints, in electrical insulating coatings, and in rubber. When tested by the method of Example 1, 0.5% remained undispersed.

We claim:

1. Dry titanium dioxide pigment of improved dispersibility in surface coating composition vehicles after compaction and storage, consisting essentially of dry titanium dioxide pigment particles uniformly carrying between about 0.01% and 3% by weight of a non-ionic alkylene oxide polymer containing at least five consecutive —C—C—O— groups, substantially all of said polymer being molecularly adsorbed on the surface of said pigment.

2. Pigment according to claim 1 wherein the alkylene oxide polymer is normally water-soluble.

3. Pigment according to claim 1 wherein the alkylene oxide polymer is the condensation product of at least five mols of ethylene oxide with a water-insoluble organophilic compound reactive therewith.

4. Pigment according to claim 3 wherein organophilic compound is a water-insoluble alkyl phenol.

5. Pigment according to claim 1 wherein the alkylene oxide polymer is ethylene oxide homopolymerized to a molecular weight between about 700 and 7,000.

6. Pigment according to claim 1 wherein the weight of the adsorbed polymer is between 0.1% and 1% of the weight of the pigment.

7. Dry titanium dioxide pigment of improved dispersibility in surface coating composition vehicles after compaction and storage, consisting essentially of dry titanium dioxide pigment particles uniformly carrying between about 0.1% and 5% by weight of at least one hydrous metal oxide and between about 0.01% and 3% by weight of a non-ionic alkylene oxide polymer containing at least five consecutive —C—C—O— groups, said polymer being molecularly adsorbed on the surface of said pigment.

8. Dry titanium dioxide pigment of improved dispersibility in water after compaction and storage consisting essentially of dry titanium dioxide pigment particles uniformly carrying between about 0.1% and 5% of silica hydrate and between about 0.01% and 3% by weight of a non-ionic alkylene oxide polymer containing at least five consecutive —C—C—O— groups, substantially all of said polymer being molecularly adsorbed on the surface of said pigment.

9. Process for the production of dry titanium dioxide pigment of improved dispersibility in surface coating composition vehicles after compaction and storage, which includes the step of uniformly adsorbing on the surface of said pigment between about 0.01% and 3%, based on the weight of said pigment, of a liquid non-ionic alkylene oxide polymer containing at least five consecutive —C—C—O— groups.

10. Process for the production of dry titanium dioxide pigment of improved dispersibility in surface coating composition vehicles after compaction and storage, which includes slurrying titanium dioxide pigment particles in aqueous medium having dissolved therein from 0.01% to 3%, based on the dry weight of the pigment, of a water-soluble non-ionic alkylene oxide polymer containing at least five consecutive —C—C—O— groups and drying said particles whereby a substantial proportion of said polymer is adsorbed on said pigment.

11. A process according to claim 10 wherein the pigment slurried in aqueous medium carries 0.1% to 5% by weight of at least one hydrous metal oxide.

12. A process according to claim 10 wherein the pH of said suspension is greater than 7.

13. A process according to claim 10 wherein the pigment is in flocculated condition while the polymer is being adsorbed thereon.

14. Process for the production of dry titanium dioxide pigment of improved dispersibility in surface coating composition vehicles after compaction and storage which comprises slurrying titanium dioxide pigment particles in aqueous medium having emulsified therein between 0.01% and 3%, based on the dry weight of said pigment, of a water-insoluble non-ionic alkylene oxide polymer containing at least five —C—C—O— groups, and drying said pigment whereby at least a substantial proportion of said polymer is uniformly and molecularly adsorbed by said pigment particles.

15. A process for the production of dry titanium dioxide pigment of improved dispersibility in surface coating composition vehicles after compaction and storage, which comprises metering a water-soluble non-ionic alkylene oxide polymer containing at least five —C—C—O— groups and titanium dioxide pigment into a fluid energy mill containing a spiral current of superheated steam, thereby spreading said polymer over the surface of said pigment.

References Cited in the file of this patent

UNITED STATES PATENTS

| | | |
|---|---|---|
| 2,809,122 | Willis et al. | Oct. 8, 1957 |
| 2,844,486 | Lamar | July 22, 1958 |
| 2,902,385 | Raab et al. | Sept. 1, 1959 |
| 2,907,670 | Katz et al. | Oct. 6, 1959 |

FOREIGN PATENTS

| | | |
|---|---|---|
| 1,101,341 | France | Apr. 20, 1955 |
| 881,849 | France | Feb. 4, 1943 |